Sheet 1-3 Sheets.
G. E. Burt.
Brush Machine.
No. 3,220. Reissued Dec. 1, 1868.
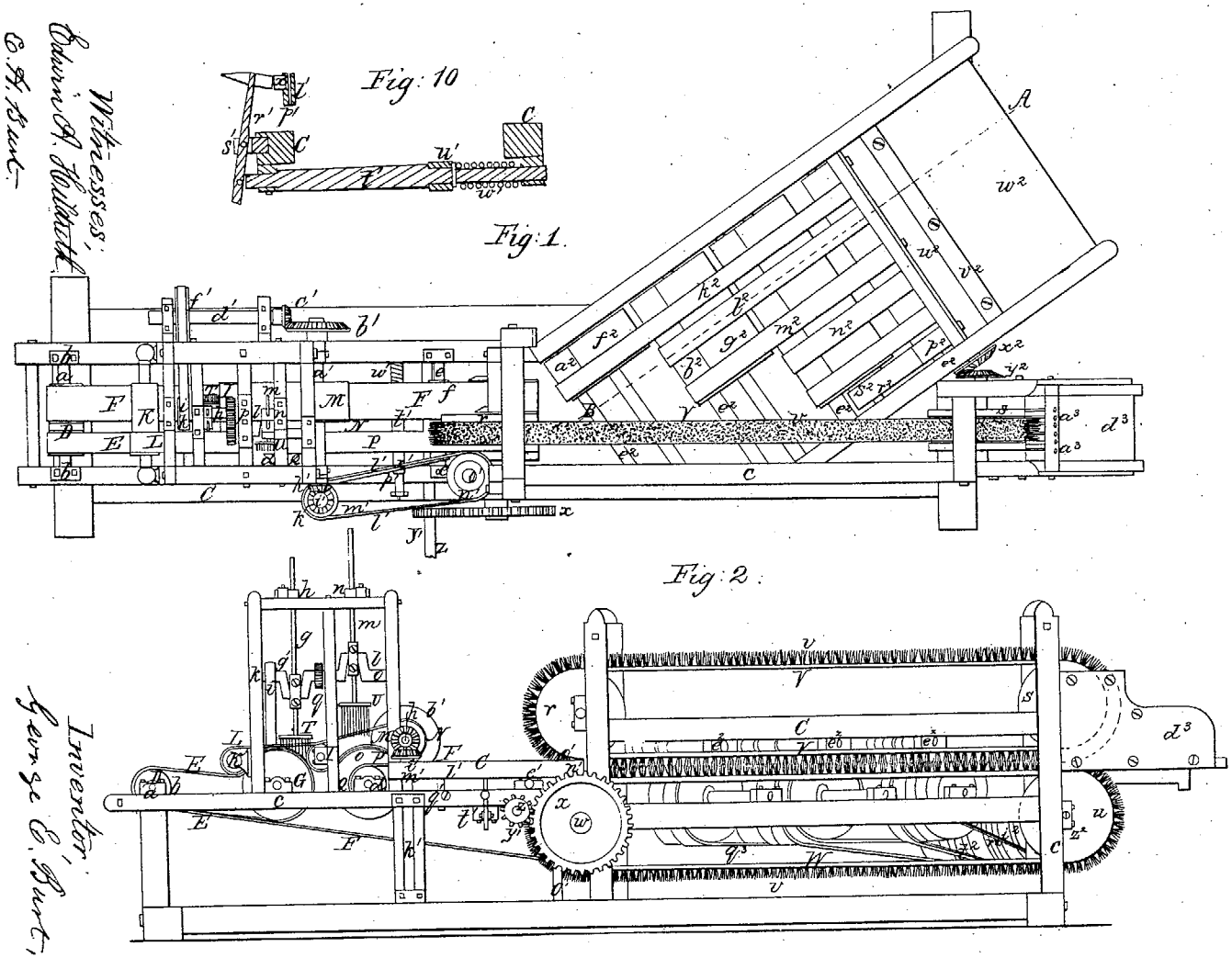
Witnesses;
Edwin A. Hildreth.
E. H. Burt.
Inventor;
George E. Burt, G. E. Burt. Sheet 2-3, Sheets.
Brush Machine.
No. 3,220. Reissued Dec. 1, 1868.
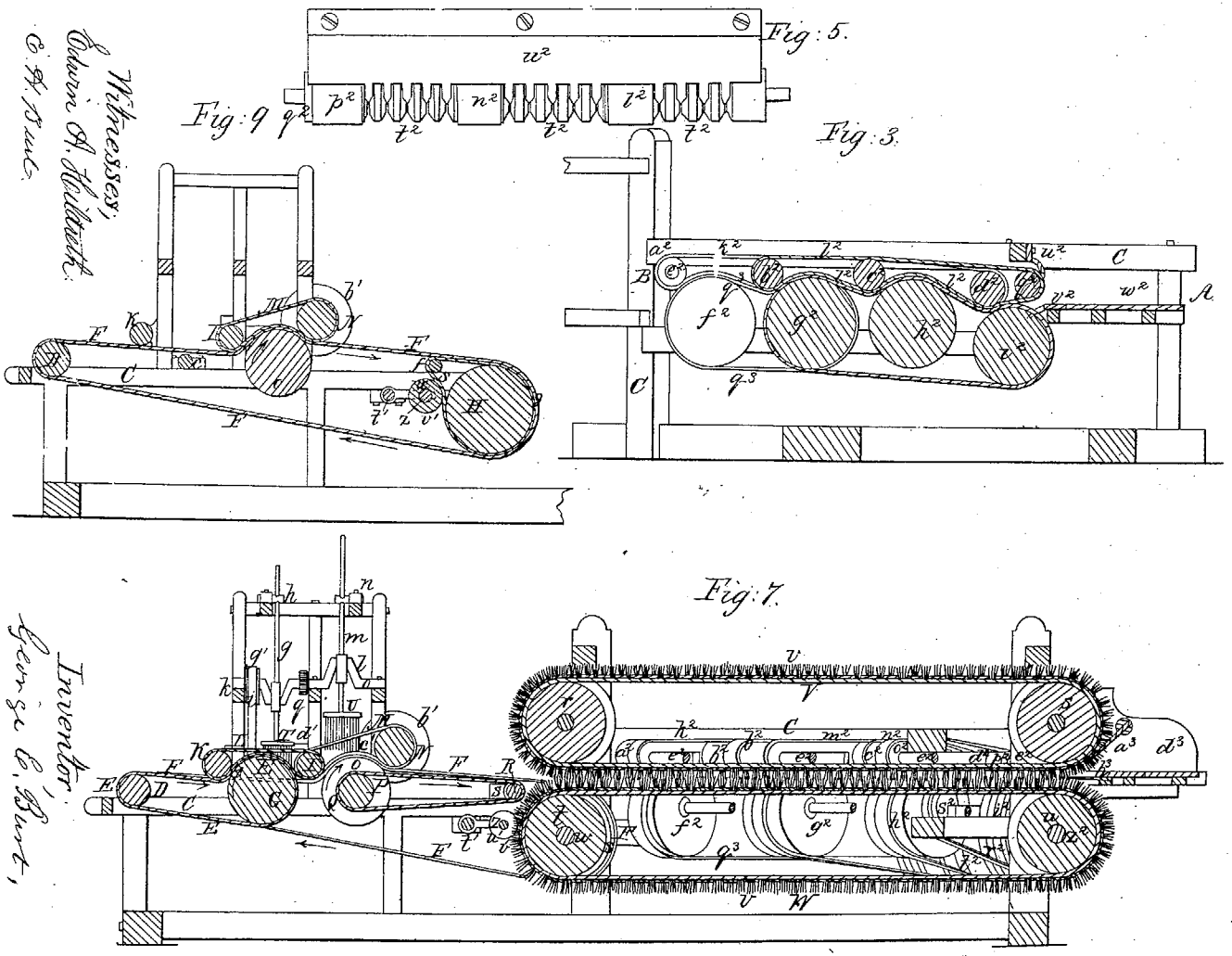
Witnesses;
Edwin A. Hilltreth.
E. H. Burt.
Inventor;
George E. Burt, G. F. Burt. Sheet 3-3 Sheets.
Brush Machine.
No. 3,220. Reissued Dec. 1, 1868.
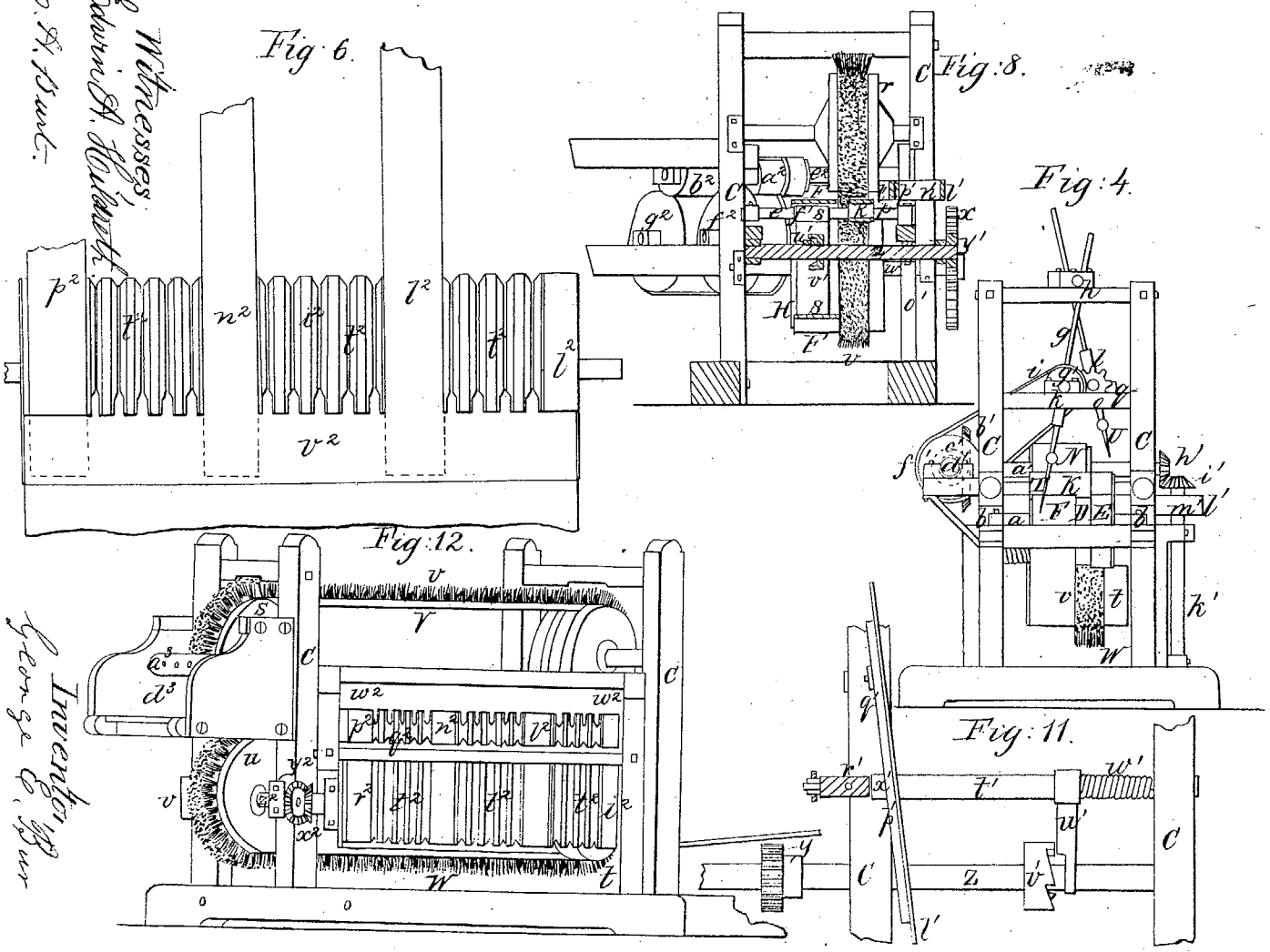
Witnesses,
Edwin A. Hildreth.
E. A. Burt.
Inventor,
George E. Burt

United States Patent Office.

NATHAN H. SPAFFORD, OF BOSTON, MASSACHUSETTS, ASSIGNEE, BY MESNE ASSIGNMENTS, OF GEORGE EDWARD BURT.

*Letters Patent No.* 10,498, *dated February* 7, 1854; *extended seven years; reissue No.* 3,220, *dated December* 1, 1868.

DIVISION A.

IMPROVED MACHINE FOR CLEANING AND ASSORTING BRISTLES.

The Schedule referred to in these Letters Patent and making part of the same.

*To all whom it may concern:*

Be it known that GEORGE EDWARD BURT, of Harvard, in the county of Worcester, (late of Westford, in the county of Middlesex, in the State of Massachusetts,) has invented a new and useful Improvement in Machines for Cleaning, Separating, and Assorting Bristles, &c.; and I do hereby declare that the following is a full and exact description thereof, reference being had to the annexed drawings, making part of this specification, and to the letters of reference marked thereon, in which—

Figure 1 denotes a top view of the said machine.

Figure 2 is a side elevation of it.

Figure 3 is a vertical and longitudinal section of the drawing-mechanism, the said section being taken from A to B of fig. 1.

Figure 4 is a forward-end view of the machine.

Figure 5 is a side elevation of the upper discharging-roller and its comb-guard.

Figure 6 is a top view of the lower discharging-roller and its comb-guard.

Figure 7 is a vertical and longitudinal section of the machine, the same being taken through the endless brush-belts, to be hereinafter described.

Figure 8 is a forward-end view of the assorting-apparatus.

Figure 9 is a section, showing the belts which seize and hold the bristles while being combed.

Figures 10 and 11 are side and top views of the hammer and its operating-mechanism.

Figure 12 is a side elevation, taken upon a plane at right angles to the line A B in fig. 1, at the rear end of the machine.

The operative parts of the machinery are supported by a strong frame, C, made of wood or other suitable material.

At one, or the forward end of this frame, is a horizontal roller, D, fixed on a shaft, A, whose journals rest and turn in boxes V V.

Two endless belts, E F, work around the roller D, one of these belts (viz, F,) being about twice the width of the other.

The narrowest belt, E, also works around a wheel or pulley, G, which is arranged as seen in figs. 1 and 7, and fixed on a transverse horizontal shaft, *c*.

The other, or wider belt, at its front, passes around an endless belt, S, working on a wheel or pulley, H, which is shown in fig. 8, which is a vertical and transverse view of the machine, taken through the driving-shaft. It is also shown in fig. 9, to be hereinafter described.

Two other cylindrical rollers, I K, are arranged, respectively, just in front and rear of the wheel G, and with their upper surfaces nearly on a level with and a little above that of the said wheel G.

An endless belt, L, works around the two rollers I K, and rests on the belt E, both belts, L and E, being borne down upon one another, and made, between the rollers I K, to stretch over about one-third of the periphery of the roller G.

Another endless belt, M, placed directly over the belt F, works around the roller I, and a roller, N, disposed as seen in figs. 7 and 9, the said belt M, as well as the belt F, being together led over a wheel or pulley, O, that is made to extend up between the two wheels or pulleys I N, as seen in fig. 9.

A fifth endless belt, P, is made to extend in line with the belt E, and around the wheels or pulleys Q R.

The pulleys Q and O are placed side by side on one horizontal shaft, *d*, while the pulley R is situated on another shaft, *e*, which also has another pulley, *f*, placed on it, directly under the belt F, as seen in fig. 9, which is a vertical section of the belt F, and the several pulleys and rollers around and with which it operates.

An endless belt, S, works around the pulley *f* and the pulley H, before mentioned.

Between the rollers I K, and over the endless belt F, is a comb or rake, T, that is attached to the lower end of a long rod or staff, *g*, that passes and slides freely through a short rocker-shaft, *h*, and receives a transverse-reciprocating movement from a belt, *i*, of a rotating crank-shaft, K.

The lower edges of the comb-teeth are made to move in an elliptical or oblong path over the belt F, which causes the teeth to enter into and comb any bristles that may be on the belt.

Another such comb, U, is also arranged just in advance of the belt L, and by the side of the pulley O.

The said comb or rake U is operated, like the comb T, by means of a crank, *l*, a rod, *m*, and a rocker-shaft, *n*, the two shafts, K and *o*, of the cranks, being connected by gears *p q*, as seen in fig. 1, so that where one is put in revolution, the other will be simultaneously rotated.

It will be seen that the points of the combs or rakes T and U move in an elliptical oblong path, with an increased accelerated motion, when the combs or rakes enter the bristles, and a lag or retarded motion when they are withdrawn.

This named increased and retarded motion of the rakes causes them to throw off any material which might otherwise adhere to and clog them. Thus the combs or rakes are made to operate and clear themselves without the aid of strippers.

The combs or rakes also have imparted to them, by the cranks *k* and *l*, an upward-rising and downward-dipping motion, which causes them to enter and withdraw themselves from the bristles.

If, when the several endless belts are made to move in the directions denoted by the arrows on them, a lot of the bristles is laid on the two belts E F, so as to extend from one to the other, transversely of the machine, they will be seized by and carried between the two belts E and L. This causes E and L to form clamps, which hold one part of the bristles firmly upon the wheel G, and present the other part to the action of the combs.

When the bristles pass over the wheel G, they will be lifted off and some distance above the belt F, so that the comb or rake T can pass between them, and comb or straighten such portions of them as project out of the two holding-belts E L.

The bristles are next carried downwards towards the belt F, and their combed portions are seized by and carried between those parts of the belts F and M, that together work over the wheel, and the bristles are firmly clamped upon the wheel O.

The uncombed portions, or those which were previously grasped by and between the belts E and L, being made by such operation to leave the said belts E and L, and project beyond the wheel O, and be raised upwards in such a manner as to enable the comb U to pass into them, and comb or straighten them out.

After undergoing the combing-process, the bristles are made to descend and pass on to the upper surfaces of the two endless belts, F and P, which are disposed on or about on the same plane, and move at the same velocity, and convey the bristles to the endles brush-belts V W.

These endless brush-belts consist of two endless bands, supported on and around wheels or rollers *r s t u*, (the rollers *r s* being placed, respectively, over the rollers *t u*, as seen in the drawings,) and having bristles extended from their outer surfaces as seen at *v*.

The upper brush-belt is arranged directly over the lower one, and at such a distance from it that their bristles, projecting from their most contiguous surfaces, extend or mesh in between one another, like the teeth of two gear-wheels.

The shaft *w* of the wheels *t* and H has a gear-wheel, *x*, fixed on one end of it, which is made to engage with and be revolved by a pinion-gear, $y^1$, that is placed on a driving-shaft, *z*, situated as seen in figs. 2 and 8.

The endless belt F receives its motion from the pulley H, where the latter is revolved by a rotary movement of its shaft. Such movement of the belt F imparts corresponding movements to the several rollers and endless belts, which, as hereinbefore described, operate in connection with the two combs, T U.

On one end of the shaft $a^1$ of the roller N, there is fixed a large bevelled gear, $b^1$, which is made to engage with a bevel-pinion, $c^1$, fixed on a shaft, $d^1$.

An endless belt, $i^1$, is made to work around two pulleys, $f^1$ $g^1$, the former being fixed on the shaft $d^1$, while the latter is fixed on the crank-shaft K.

By such means, motion is communicated from the roller N to the shaft K, in order to put the two combs in operation.

Another bevel-gear, $h^1$, is placed on the other end of the shaft $a^1$, and is made to engage with and turn a bevel-gear, $i^1$, fixed on the top of a vertical shaft, $k^1$, the whole being arranged as seen in figs. 1, 2, and 4.

An endless belt, $l^1$, is arranged as seen in said figures, and so as to work horizontally around two pulleys, $m^1$ $n^1$, fixed respectively on the two upright shafts $k^1$ $o^1$. The inner face of the belt is inclined towards the two brush-belts V W, and the front pulley of the endless belt P, and behind, against the inner portion of the belt $l^1$, a spring or board, $p^1$, is placed, as seen in fig. 1, it being supported at or near its rear end by a standard or post, $q^1$.

A small hammer-lever, $r^1$, is arranged against the outer face of the board $p^1$, as seen in figs. 1, 2, and 10, the latter figure being a vertical section of the hammer-lever and its slide-shaft, and the spring thereof. The said hammer $r^1$ turns on a fulcrum, $s^1$, and is jointed at its lower end to a sliding horizontal shaft, $t^1$, from which a projection, $u^1$, extends, as seen in fig. 11, which is a top view of this shaft, and the driving-shaft adjacent to it.

A cam-wheel, $v^1$, affixed on the driving-shaft, and provided with a series of cams on its side next the arm $u^1$, so acts against the said arm during the rotary movement of the driving-shaft, as to successively move it in one direction, and allow it during such movements to be moved back in the opposite direction by a spring, $w^1$.

This longitudinal movement of the shaft causes the hammer $r^1$ to rapidly strike against the board $p^1$, or a small anvil, $x^1$, attached to it. Now, as the bristles are moved along by the endless belts P and F, their ends next the belt $l^1$ will be carried in contact with such belt, and by means of the concussion of the raps or blows of the hammer $r^1$ against the spring-board $p^1$, these bristles will be so agitated or disturbed as not only to prevent an adhesion of their buts or roots to the guide-belt $l^1$, (whereby, by the forward movement of the endless belts, on which they rest, the bristles would be liable to be thrown around or out of place,) but also to cause them to settle properly on the supporting-belts, for presentation to the endless brush-belts.

The bristles are received at their buts by the two endless brush-belts, and are held by and between the bristles thereof, As the bristles so held, are of various lengths, they are next to be seized and drawn away from the brush-belts, the longest ones being the first, and the shortest being the last to be drawn away.

The mechanism for producing this effect may be thus described: Four rollers or cylinders $a^2$ $b^2$ $c^2$ $d^2$, of different lengths, are arranged respectively on four parallel and horizontal shafts $e^2$ $e^2$ $e^2$ $e^2$, that are disposed obliquely to the vertical plane of the two endless brush-belts V W, all as seen in fig. 1.

Just in front of and below each one of these rollers, is a larger roller, $f^2$, $g^2$, $h^2$, or $i^2$, made of the same length as the roller to which it appertains.

The upper edge of either of the lower rollers $f^2$, $g^2$, $h^2$, or $i^2$, is made to stand somewhat above the lower edge of the roller $a^2$, $b^2$, $c^2$, or $d^2$, above and next adjacent to it.

A series of endless belts $k^2$ $l^2$ $m^2$ $n^2$ $o^2$ $p^2$, is applied to the upper set of rollers $a^2$ $b^2$ $c^2$ $d^2$. The first or longest belt passes around the rollers $a^2$ $d^2$, and above and below the rollers $b^2$ $c^2$, and rests on another endless belt $q^3$, that extends around the rollers $f^2$ $g^2$, as seen in fig. 3.

The next endless belt $l^2$ extends from and around the roller $b^2$, and the upper of two grooved delivery-rollers $q^2$ $i^2$, and goes over and under said rollers $c^2$ $d^2$. The endless belt $m^2$ extends from the roller $b^2$ to the roller $d^2$, and goes both above and below the roller $c^2$.

So, with the next belt $n^2$, it extends from the roller $c^2$ to the upper delivery-roller $q^2$, while the belt $o^2$ extends from the roller $c^2$ to the roller $d^2$.

Each belt $k^2$ $l^2$ $m^2$ $n^2$ $o^2$ operates in connection with an endless belt placed under it, and made to pass around some of the rollers $f^2$ $g^2$ $k^2$ $i^2$, as does the belt $q^3$.

The last, $p^2$, travels around the roller $d^2$ and the upper delivery-roller $q^2$, and it has its belt $r^2$ under it, which belt plays around the roller $i^2$, and a pulley or wheel, $s^2$, fixed on the shaft of the roller $h^2$. The upper delivery or discharging-roller $q^2$, as well as the lower one, $i^2$, is constructed with numerous grooves $t^2$ $t^2$, extending transversely around them, the said grooves of each roller being made respectively to receive the teeth of one of two combs, $u^2$ $v^2$, arranged as seen in figs. 3, 5, and 6.

These combs or guards serve, in connection with the grooves, to prevent the discharged bristles not only from passing up over the upper delivery-roller, but from passing down under the lower one.

A suitable box or receptacle, $w^2$, is arranged to receive the bristles as they are discharged from the delivery-rollers.

I would remark that the endless belts of the delivery-rollers are to move with the same, or about the same velocity as that of the endless brush-belts; also, that the rollers $a^2$ $b^2$ $c^2$ are placed at different distances from the two belts V W, the roller $c^2$ being nearer thereto than the roller $b^2$, while this latter is nearer than the roller $a^2$.

Now, as these latter belts, viz, V W, hold the bristles at their buts, and as the bristles are of various lengths, they will be seized by and between the endless belts $k^2$ $m^2$ $o^2$, and those directly under them, and drawn out of the brush-belts, those bristles beyond a certain length being first removed, (by the belt $k^2$ and its fellows under it,) while those whose length is between such first-mentioned length and a lesser standard of length, being next removed by the belt $m^2$, and that directly below it, the next size of bristles will be seized and drawn away from the brush-belt by the belt $o^2$, and that directly under it. Finally, the bristles in assorted sizes, will be delivered into the box or receptacle $w^2$.

The proper movements of the endless-belt draught and delivery-mechanism are produced by rotating the lower delivery-roller, and in order to do this, there is a bevelled gear, $x^2$, fixed on its shaft, and made to engage with another such gear $y^2$, placed on the shaft $z^2$ of the front roller of the lower endless brush-belt, (see fig. 12,) which is a rear-end view of the machine.

In order to clean each of the brush-belts V W of the refuse bristles that may be left in them, I apply to each of them a stationary comb, as seen at $a^3$ $b^3$, in figs. 7 and 12.

These combs discharge the said refuse upon a platform or into a suitable receptable, $d^3$.

What I claim as the invention of the said George Edward Burt, is as follows:

1. A machine for combing bristles, combining in its construction the following elements, viz, a comb, a clamp for holding the bristles while subjected to the action of the comb, and suitable mechanism for passing the comb through the bristles, and for combing the same, substantially as set forth.

2. In combination with the comb, a movable clamping-apparatus, by which the bristles are brought into proper position to be acted upon by the combs.

3. The combination of the movable combs T and U with the clamping-belts E and L, F and M, combined and operating substantially as described.

4. In combination with the dragging and conveying-mechanism, the double brush-belts, arranged to act as conveyers, substantially as set forth.

5. A machine for dragging and assorting bristles, combining in its construction the following groups of elements, viz, mechanism for combing the bristles, a conveying-mechanism, for carrying the bristles after being subjected to the action of the comb, and mechanism for successively taking up the bristles of different lengths, substantially as described.

6. A conveyer so arranged, as to clamp the bristles between two surfaces, for holding them in such a manner that one end of the bristles may project therefrom, in combination with an assorting-mechanism, so arranged in relation thereto, that the bristles shall be separated and taken out successively, according to their lengths, substantially in the manner set forth.

7. The spring-board $p^1$, and hammer $r^1$, combined and arranged to operate substantially in the manner and for the purpose specified.

8. The combination of the combs $u^2$ $v^2$, with the grooved delivering-rollers, arranged to operate substantially in the manner and for the purpose specified.

In testimony whereof, I have signed my name to this specification, before two subscribing witnesses.

NATHAN H. SPAFFORD.

Witnesses:
E. A. Kelly,
Daniel S. Burnham.